June 22, 1937.  R. J. S. PIGOTT  2,084,623
FLUID PRESSURE GAUGE
Filed July 15, 1932
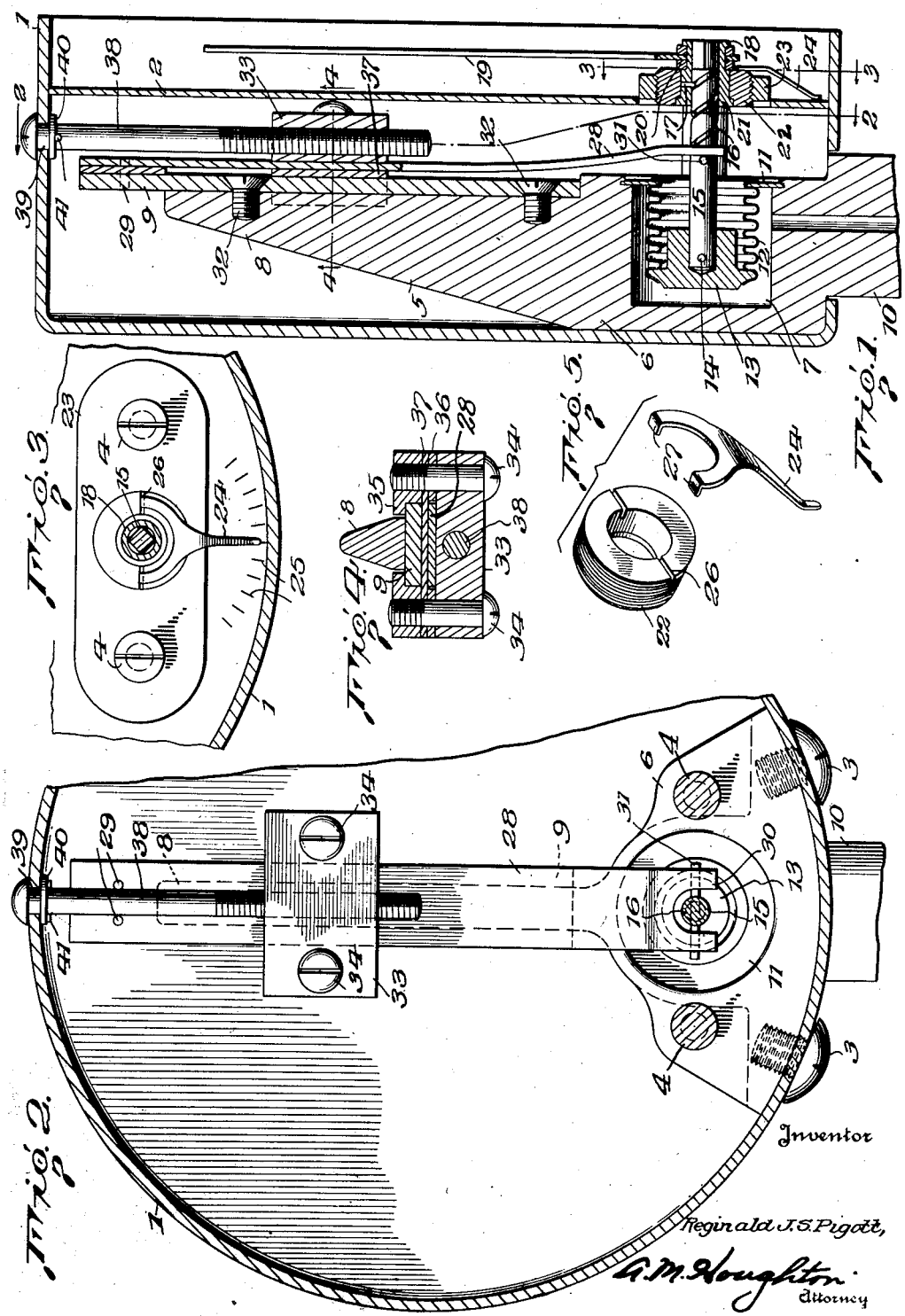
Inventor
Reginald J. S. Pigott,
G. M. Houghton
Attorney Patented June 22, 1937

2,084,623

UNITED STATES PATENT OFFICE 2,084,623

FLUID PRESSURE GAUGE

Reginald J. S. Pigott, Pittsburgh, Pa., assignor, by mesne assignments, to Gulf Research & Development Company, Pittsburgh, Pa., a corporation of Delaware Application July 15, 1932, Serial No. 622,719

7 Claims. (Cl. 73—110)

This invention relates to fluid pressure gauges; and it comprises a gauge for measuring fluid pressure having a chamber adapted for communication with a source of fluid, the pressure of which is to be measured, a pressure responsive element comprising a bellows in said chamber, one end of the bellows being fixed and open to the atmosphere and the other end adapted for movement and carrying a movement staff, a helical groove on the staff, a follower engaging the groove and carrying an indicator hand, the follower being advantageously mounted for longitudinal adjustment along the staff to set the hand at zero, and an adjustable auxiliary spring engaging the staff and having straight line characteristics whereby for every adjustment of said spring, equal increments of pressure to which the bellows is subjected will be represented by equal increments of deflection of the indicator hand; all as more fully hereinafter set forth and as claimed.

Fluid pressures are most commonly measured with gauges employing a Bourdon tube. Such tubes are made of spring metal curved and closed at one end. Fluid pressure is admitted to the tube at the other end and as the pressure increases the tube bends and tends to straighten itself. When the pressure in the tube is released the tube springs back into its natural curved position.

The difficulty with these gauges is that a single Bourdon tube is limited to measuring a comparatively narrow range of pressure. The range of pressures from 15 to 2500 pounds is measured usually by some sixteen separate gauges, calibrated for maximum pressures as follows: 15, 30, 60, 100, 150, 200, 250, 300, 400, 500, 600, 800, 1000, 1500, 2000 and 2500 pounds respectively, each using a different weight tube.

A further difficulty with this type of gauge is that the stiffness of the Bourdon tube cannot be precisely determined until it is made. The stiffness varies sometimes as much as plus or minus 10 per cent of the maximum pressure reading of the gauge and to correct this error a small ratio adjustment is necessary. This usually consists of an adjustable slide on the sector arm of the gauge. A further disadvantage is in the lever system used to provide sufficient multiplication of the movement of the tube to move the indicator hand through an arc of about 270°. The movement of an ordinary brass Bourdon tube for measuring pressures up to 1000 pounds is only about $\frac{1}{16}$ of an inch and of a steel hydraulic tube about $\frac{1}{32}$ of an inch. This requires a multiplication ratio of 8:1 or 10:1 for gauges up to 1000 pounds, 12:1 to 16:1 for hydraulic gauges (above 1000 pounds).

I have found that if a bellows type of gauge is provided with an adjustable spring having straight line characteristics throughout its adjustments, it is well adapted for use in measuring pressures of widely differing magnitude and of indicating these pressures on a uniformly graduated machine stamped dial. Such spring may advantageously be a flat leaf spring provided with an arrangement for changing its length, or otherwise changing its stiffness.

It is an object of the present invention to provide a pressure gauge which is well adapted for accurately measuring a wide range of pressures.

Another object of this invention is the provision of a pressure gauge in which equal increments of movement of the pressure responsive element are represented by exactly equal angular movements of the indicating hand, making it possible to use a uniformly graduated, accurately reading scale.

A further object of this invention is to provide a pressure gauge with an adjustable restraining spring having straight line characteristics, whereby pressures of different magnitude may be measured and indicated on a uniformly graduated machine stamped dial.

A further object of this invention is to provide adjusting means for the auxiliary spring which shortens the effective length thereof and increases its stiffness without changing its initial position or bearing pressure relative to the indicating hand mechanism.

A further object of this invention is to provide means for readily adjusting or setting the indicating hand at the zero mark on the scale without restraining the working parts of the gauge.

In accordance with my invention I accomplish these objects by providing a pressure gauge having any convenient shape of casing with a graduated dial front and an indicating hand adapted to swing across the face of the dial and to register with the graduations. Immediately in back of the dial is positioned a pressure chamber one wall of which is provided with an extension to which is secured a leaf spring. In the pressure chamber, which connects to the outside of the gauge where it is provided with pressure line attachment means, is a cylindrical corrugated bellows made of metal or constructed of gas impervious fabric, of rubber, or rubberized fabric or other similar flexible material. When the bellows is made of fabric, metallic rings may be provided in each of its corrugations to prevent the walls of the bellows from caving in when subjected to high pressure. The bellows is arranged within the chamber with its front end fixed to the front wall and its rear end free to move forward and backward. Secured to the rear end or wall of the bellows is a movement staff which extends to the outside of the dial and connects through a helical groove, pin or worm with a follower to which is secured an indicator hand. The follower consists of a loosely fitting sleeve provided with a pin or other means for engaging the helical cam surface of the movement staff. The sleeve carries an indicating hand at one end and is provided with a shoulder at the other end. Supporting the follower and preventing its movement relative to the body of the gauge is an adjustment nut. This nut is positioned on the sleeve between the shoulder and a snap locking ring used to fasten the indicator hand to the follower. The nut is provided with a short lever for turning the same and screws into a fixed plate to longitudinally adjust the position of the follower on the staff. When the follower is moved along the staff by the adjusting nut it is rotated slightly by the helical groove and pin to set the indicator hand at zero. The movement staff is also provided with a pin which engages the free end of an adjustable leaf spring. The resistance afforded by the spring is imparted to the rear end of the bellows to supply the additional restraining force necessary when the gauge is used for measuring high pressures.

Adjustment is accomplished by means of a screw operated member through or under which the spring passes. The screw operated member is arranged to increase the stiffness of the spring without increasing its initial bearing pressure upon the pin on the staff so that regardless of how stiff or how flexibly the spring is adjusted, its initial tension will always be constant and will not affect the zero reading of the indicator hand.

In the accompanying drawing I have shown one form of a specific embodiment of my invention.

Fig. 1 is a vertical section showing the operation and arrangement of the various parts of my invention.

Fig. 2 is a fragmentary sectional view taken along line 2—2 of Fig. 1 and shows the instrument with the front and hand indicating mechanism removed.

Fig. 3 is a fragmentary section taken along line 3—3 of Fig. 1 and shows the position of the zero adjustment lever.

Fig. 4 is a detail sectional view taken along line 4—4 of Fig. 1 and shows the arrangement of the spring adjustment means, and Fig. 5 is a detail perspective view of the indicating hand adjusting nut and operating lever.

Referring to the drawing throughout the several views of which like numerals indicate corresponding parts, I is a cylindrical casing or housing containing the mechanism of the gauge and provided with a dial front as shown at 2 which may be graduated or adapted to receive a chart properly calibrated. Within the casing and secured thereto by any suitable means such as machine screws 3 is an elongated member or casting 5. This member has an enlarged portion 6 at one end containing the pressure chamber 7 and is provided at the other end with a narrow support 8 for reception of the leaf spring bed 9. The interior of the pressure chamber 7 communicates with the outside of the casing through a short extension 10 formed on the member 5 and the outermost end of this extension is provided with suitable connecting means, not shown, for attachment with a pressure line or with a source of pressure to be measured. Positioned within the pressure chamber and secured to the front wall 11 thereof is a corrugated bellows 12 arranged to expand and collapse according to the pressure within the chamber 7. As shown in Fig. 1 the forward or fixed end of the bellows, is open to the atmosphere while the rear or moving end is closed by a plate 13. Secured to plate 13 and prevented from turning therein by pin 14 is the movement staff 15. This staff extends through the center of the bellows to the outside of the dial 2 where it operates the indicating hand mechanism about to be described. The outer end of staff 15 is provided with a helical cam or gear 16 which engages a follower pin 17 in sleeve 18 rotatably mounted on the end of the staff. The indicator hand 19 is rigidly secured to the outer end of sleeve 18 by means of 2 snap rings 20. The inner end of the sleeve is also provided with a collar or shoulder 21. Fitting closely between shoulder 21 and snap rings 20 is an adjusting nut 22 screwing into a fixed plate 23 to prevent lateral movement of the sleeve relative to body 5. Plate 23 is secured to the enlarged portion 6 of the member 5 by machine screws 4 (Fig. 3). From the above it may readily be seen that as a result of any longitudinal movement in and out of the staff 15 the helical gearing 16 and 17 causes the sleeve 18 carrying the indicator hand to rotate forward or backward, and further, that by adjusting the nut 22 the sleeve may be carried along the staff and caused to rotate in order to set the indicating hand at the zero graduation on the dial scale. In order that adjustment of this nut may be easily accomplished it is provided with a short lever 24, yoke-shaped at one end to fit around the staff 15 and bent to form a locking lever at the other end to engage with small indentations 25 provided on the dial. These indentations afford locking means for the lever 24. The face of adjusting nut 22 is slotted as shown at 26, in Fig. 5 and receives the turned over ends 27 of the yoke which are securely fastened thereto so that the lever is operatively connected with the nut for turning the same.

As so far described it will be noted that the pressure of the fluid in the chamber 7 is applied externally to the bellows and that the only resistance preventing the bellows from collapsing is the inherent stiffness of the bellows plus small friction developed in the cam mechanism for rotating the indicator hand. Where the bellows is made of spring metal such as a sylphon bellows this resistance may be sufficient for measuring low pressures but where the gauge is used for measuring high pressures some form of auxiliary resistance must be used in cooperation with the bellows. For this purpose I provide a spring 28 which is simply a thin flat narrow strip of steel fastened at one end by rivets 29 or the like to the spring bed 9 with its free end bifurcated as at 30 to engage a pin 31 positioned on the movement staff immediately to the rear of helical groove 16. From the fixed end of the spring to a point about two-thirds of its length the spring is straight but from this point on it curves outward slightly until just before it reaches the pin on the movement staff where it flattens out again to rest upon the pin. The spring bed 9 is fastened to the extension 8 by means of screws 32. In order that the stiffness of the spring may be adjusted a slidable member is provided which moves along the spring to increase or decrease its effective length; that is, the portion of the spring which is free to move or vibrate. This member is composed of a block 33 extending beyond the sides of the spring and spring bed, bolts 34 on each side of the block and ears 35 cooperating with the bolts and adapted to engage the sides and bottom of the bed as shown in Fig. 4. Spacing members 36 and 37 are provided so that the spring may be held firmly and kept spaced evenly above the surface of the bed 9 in any position to which the slidable member may be moved. The member is moved along the spring by means of adjusting screw 38 extending through the casing or housing 1 of the instrument as shown at 39. A washer 40 and pin 41 are provided on the adjusting screw where it passes through the casing to prevent longitudinal movement of the screw. In any position, the portion of the spring behind the block is held immovable. The spring may be calibrated for different positions of the spring shortening member corresponding to the different maximum pressures the gauge is capable of measuring and indicating means, not shown, may be provided for indicating the position of the spring shortening member on the spring and the corresponding pressure readings obtainable for this adjustment.

The gauge is calibrated as follows: The position of the indicator hand is first ascertained and set at zero if necessary by means of the adjusting lever 24. The gauge is then connected to a standard gauge tester set at a desired maximum pressure and the spring adjusting block is moved until the indicator hand of the gauge registers with the proper graduation on the dial. A suitable line is then scribed on the spring bed 9 indicating for future reference the proper position of the spring adjusting block when the gauge is used for pressure not exceeding that particular maximum. This procedure is continued for a number of maximum pressures until the entire range of the gauge has been covered. It is possible with this construction to accurately measure pressures varying from 15 to 2500 pounds per square inch with only two gauges instead of the usual sixteen gauges.

The gauge herein disclosed is simple in construction and operation and cheap to manufacture. It is of rugged construction, and yet very sensitive and well adapted to give accurate readings for pressures of widely differing magnitude.

What I claim is:

1. A fluid pressure gauge comprising a chamber adapted for communication with a source of fluid pressure, a pressure responsive element comprising a bellows in said chamber, one end of said bellows being fixed and open to the atmosphere and the other end adapted for movement and carrying a movement staff, the movement staff being provided with a helical groove, a follower engaging said helical groove and carrying an indicator hand, an auxiliary spring engaging said movement staff and adapted to oppose pressure movements thereof and means for shortening the effective length of said spring to increase its stiffness.

2. In a fluid pressure gauge a reciprocating movement staff adapted to be actuated by a pressure responsive element, a helical groove on said movement staff, a follower engaging said helical groove and adapted for rotation thereby, an indicator hand mounted on said follower and means for longitudinally moving said follower along said movement staff to set the indicator at zero.

3. A fluid pressure gauge comprising a chamber adapted for communication with a source of fluid pressure, a pressure responsive element comprising a bellows in said chamber forming a closure therefor, one end of said bellows being fixed and open to the atmosphere and the other end adapted for pressure responsive axial movement and carrying a movement staff, a follower sleeve rotatably mounted upon said movement staff, an indicating hand carried by said follower sleeve, screw means so connecting the movement staff and the follower sleeve as to rotate the sleeve upon axial movement of the movement staff and means for setting the axial position of the follower sleeve upon the movement staff.

4. A fluid pressure gauge as claimed in claim 3 and having means for setting the follower sleeve comprising a plate fixed to the pressure chamber and having an opening surrounding the follower sleeve and an adjustable nut threaded into said plate and engaging the follower sleeve.

5. In a fluid pressure gauge having a movement staff adapted to be reciprocated by a pressure responsive element, a helical groove on said movement staff, a follower engaging said helical groove and adapted for rotation thereby and an indicator hand mounted on said follower, means for setting said indicator hand at zero, said means comprising an adjustable member engaging said follower for adjustment of the follower longitudinally of the movement staff, said longitudinal movement of the follower resulting in a rotation thereof and of the indicator hand carried thereby.

6. A fluid pressure gauge having a rectilinear reciprocating member adapted to be moved longitudinally back and forth in direct response to the fluid pressure and in equal increments corresponding to equal increments of pressure, rotary indicating means, means at one end of the rectilinear reciprocating member engaging and positively actuating the indicating means in both directions of movement of the reciprocating member, the rotary indicating means giving equal angular deflections for equal movements of the reciprocating member, and a straight spring directly engaging the reciprocating member behind the actuating and indicating means and restraining the movement of the reciprocating member and preserving the equality of deflections of the indicating means for equal movements of the reciprocating member.

7. A fluid pressure gauge comprising a bellows expanding and contracting linearly with variations of pressure thereon, a closed chamber surrounding the bellows and in communication with a source of fluid pressure, a motion transmitting member directly connected to the bellows and being actuated thereby and moving equal distances for equal increments of pressure, indicating mechanism positively actuated by the motion transmitting member and adapted to give equal increments of deflection for equal movements of the said member, a leaf spring directly engaging said motion transmitting member and having a section free to bend, the spring restraining the movement of said member so that equal increments of motion are imparted to the indicating mechanism for equal increments of pressure applied to the bellows and means for adjusting the effective length of the spring comprising adjustable clamping means closely fitting the spring and blocking off and holding a section of the spring firmly against pivotal deflections and leaving said other section free to bend, said clamping means being adjustable longitudinally with respect to the spring, so that the gauge can be adjusted to indicate pressures over different ranges.

REGINALD J. S. PIGOTT.